Figure 1:
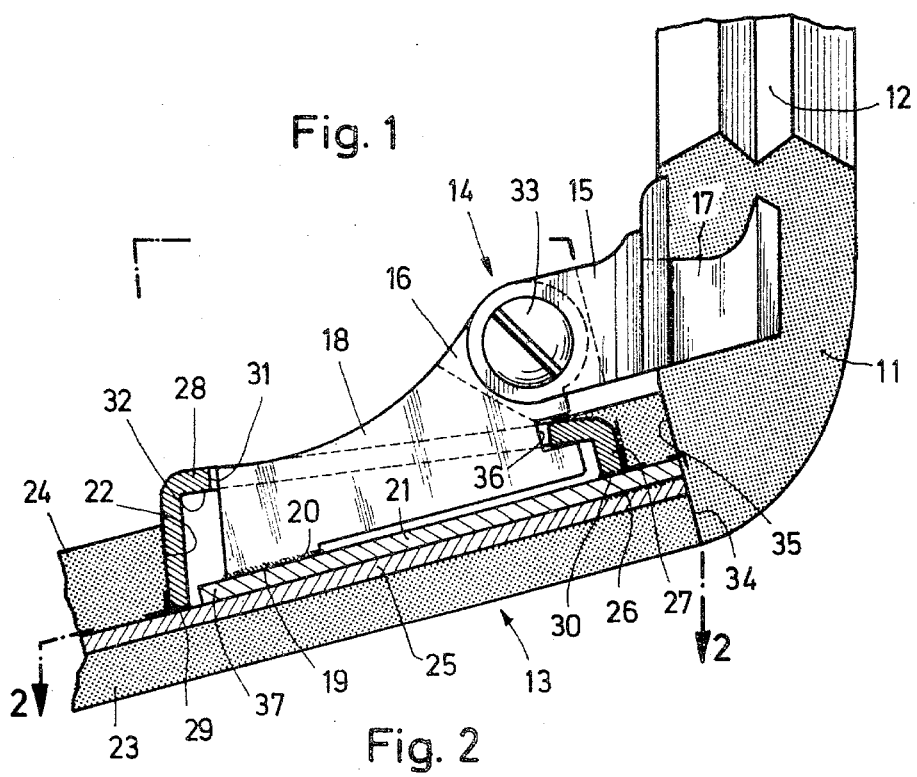

United States Patent [19]

Filitz

[11] 3,744,886
[45] July 10, 1973

[54] HINGE CONSTRUCTION FOR SPECTACLES FRAMES

[75] Inventor: Otto Filitz, Ruhpolding, Germany

[73] Assignee: Otto Filitz & Co. Fabrik Optischer, Muhlacker, Germany

[22] Filed: Dec. 16, 1971

[21] Appl. No.: 208,859

[30] Foreign Application Priority Data
Dec. 23, 1970   Germany.................. P 20 63 426.8

[52] U.S. Cl................. 351/113, 16/128 A, 351/153
[51] Int. Cl......... G02c 5/16, G02c 5/22, E05d 5/00
[58] Field of Search.................... 351/113, 140, 153; 16/128 A

[56] References Cited
UNITED STATES PATENTS
3,531,190   9/1970   LeBlanc............................. 351/113
3,644,023   2/1972   Villani .............................. 351/113

Primary Examiner—David Schonberg
Assistant Examiner—Paul A. Sacher
Attorney—Lawrence E. Laubscher

[57] ABSTRACT

Improved spectacles frame hinge means for pivotally connecting a temple member for pivotal movement between "closed," "normal open" and "overextended open" positions relative to a frontpiece. The invention is characterized in that the hinge means includes a pair of pivotally connected hinge arms one of which is adapted for rigid connection at its free end with the frontpiece, and leaf spring means for resiliently connecting the free end of the other of said hinge arms with said temple, whereby upon pivotal movement of said temple beyond said "normally open" position toward said "overextended open" position, said leaf spring means flexes to permit movement of said second hinge arm relative to said temple.

5 Claims, 2 Drawing Figures

HINGE CONSTRUCTION FOR SPECTACLES FRAMES

This invention relates generally to a spectacles frame hinge construction that permits the temple to be pivotally displaced between "closed," "normally open" and "overextended open" positions relative to the frontpiece, use being made of leaf spring means for connecting one of the hinge arms with the temple.

Various spectacles frame embodiments have been presented in the patented prior art that include resilient hinge means for permitting movement of a temple member from a "normal open" to an "overextended open" position relative to a frontpiece. In the spectacles frame construction shown in the German published specification No. 1,815,702, the temple and frontpiece components have conventional cooperating stop surfaces that are in engagement when the temple is in the "normal open" position. Tensioned spiral spring means connect the free end of one hinge part with the temple member, the components being contained in a recess and covered with a cover member. Since the spring is arranged for expansion longitudinally of the temple, the elastic hinge part necessarily must have an appreciable structural length. Furthermore, when the springs are connected with rods that act on the temples, a large number of components must be provided that are subject to loss.

In the alternative embodiment presented in the German patent No. 1,121,363, resilient hinge means are disclosed that include a leaf spring that protrudes from the outer side of the temple member for connection with an exposed unsightly intermediate metal member. In this embodiment, the customary hinge unit cannot be used on either the temple or on the frontpiece.

In other known spectacles frame embodiments that include leaf spring means as part of the hinge structure, the direct support of the temple stop surface by the corresponding frontpiece stop surface can be achieved only if the temple is laterally divided and if the rear temple piece can be resiliently displaced from the division point. Although the leaf spring is firmly connected at one end with the temple, it cannot act on the hinge arm itself, but rather is connected with the temple via double lever means provided at the division point (as shown, for example in German Design Patent No. 1,986,221). In this design, the unsightly twin division of the temple always reveals the gaping joint crack when the temple is in the "normal open" position.

Finally, in the spectacles frame embodiment disclosed in the French patent No. 1,311,362, it has been proposed to mount the leaf spring in the frontpiece of the spectacles frame, thereby resulting in a large reduction in the cross-section of the frontpiece at precisely the point that the frame is subjected to the greatest stress, whereby the durability of the frame is greatly reduced. The present invention was developed to avoid the above and other drawbacks of the known spectacles frame resilient hinge constructions.

Accordingly, a primary object of the present invention is to provide a spectacles frame hinge construction of the resilient leaf spring type wherein the leaf spring means are concealed within the inside surface of the temple, the temple and frontpiece components being provided with the usual stop surfaces that cooperate when the temple member is in the "normal open" position. The leaf spring means are so designed that the conventional hinge arms may be utilized, the length of the resilient accessory longitudinally of the temple being reduced to a minimum.

To this end, the leaf spring means is connected at one end with the free extremity of one of the hinge arms, and the other end of the leaf spring is connected with the temple adjacent the hinge axis. Consequently, a reduction of the resilient component of at least one half is achieved relative to the prior coil spring elastic means. Furthermore, owing to the use of flat leaf spring means, the resilient means does not overly protrude from the inside temple surface.

The assembly of the concealed leaf spring means is quite simple, particularly since the leaf spring means has normally, when in the non-stressed condition, a linear configuration in contiguous parallel engagement with a metal insert contained longitudinally within the temple. Preferably the leaf spring member is welded at the end adjacent the hinge axis with the corresponding end of the metal insert, the other end of the leaf spring member being welded to the corresponding hinge arm.

The required stop means for normally limiting the extent of opening of the temple member relative to the frontpiece is achieved by arranging the leaf spring means in a longitudinal recess contained in the inner surface of the temple member. The leaf spring means is covered by a cover member that contains a slot for freely receiving the corresponding hinge arm that is connected with the leaf spring means. The free extremity of the leaf spring cooperates with the top portion of the cover member to positively limit the extent of movement of the temple toward the "overextended open" position.

In order to prevent penetration of dirt under the cover member and to improve the guidance of the temple hinge part, the top portion of the cover adjacent said slot is adapted to extend within a corresponding recess contained in the end portion of the temple hinge member adjacent the hinge axis when the temple is in the "normal open" position.

Figure 2:
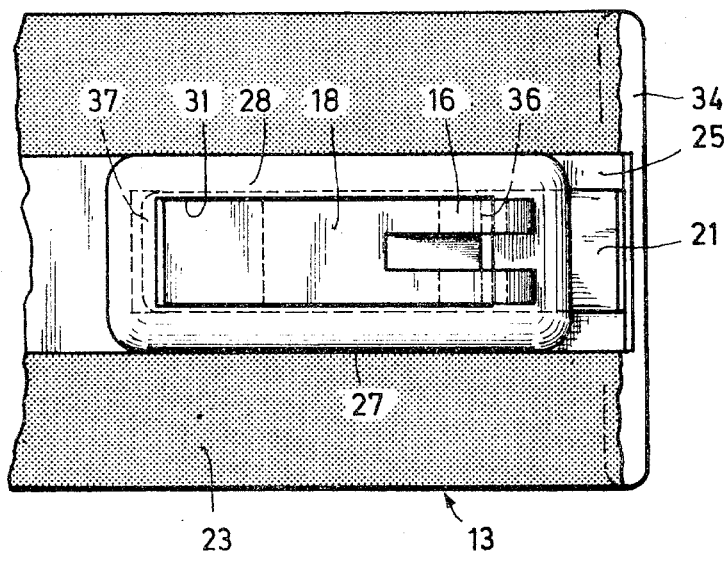

Other objects and advantages of the invention will become apparent from a study of the following specification when viewed in the light of the accompanying drawing, in which:

FIG. 1 is a detailed sectional view of the spectacles frame hinge means of the present invention when the temple is in the "normal open" position relative to the frontpiece; and FIG. 2 is a sectional view taken along line 2—2 of FIG. 1.

Referring now to the drawing, the spectacles frame includes a conventional frontpiece 11 containing a pair of notched openings 12 for receiving lenses (not shown), and a temple member 13 that is pivotally connected with the front piece by hinge means 14. The hinge means comprises a pair of pivotally connected arms 15, 16 the first one (15) of which includes three hinge flaps and the other (16) of which includes two hinge flaps. The first arm carries at its free extremity an anchor portion 17 that is embedded in the frontpiece 11, which frontpiece is generally formed of celluloid, synthetic plastic material, or the like. The other hinge arm 16 includes an intermediate portion 18 and an end extremity 19 that is welded by weld seam 20 with one end of a leaf spring member 21. The leaf spring member 21 is contained in a recess 22 provided in the inner surface 24 of the temple 13, said leaf spring member normally having a linear configuration contiguous and parallel with a metal insert plate 25 that is embedded within and extends longitudinally of the temple 13 between the outer and inner temple portions 23 and 24, respectively. At the end adjacent the pivot axis of the hinge means, the leaf spring 21 is welded by weld seam 26 with the adjacent portion of the insert 25. The leaf spring means is enclosed in a concave cover member 27 having a top portion 28 that contains a slot 31 which freely receives the intermediate portion 18 of the temple hinge arm 16. The hood member 27 extends within the recess 22 and is welded at one end with the insert 25 by the weld seam 29, and at the other end with the leaf spring means by the weld seam 30. The extremity 37 of the leaf spring 21 extends beyond the extremity 19 of the temple hinge arm and defines a stop that engages the corresponding stop 32 on the under surface of the top portion of cover 27 to limit the overextended extent to which the temple may be pivoted beyond the "normal open" position illustrated in FIG. 1. Adjacent the hinge axis the temple hinge arm 16 contains a recess 36 that receives the corresponding edge portion of the cover when the temple is in the illustrated normal open position.

As shown in FIG. 1, when the temple 13 is in the "normal open" position, corresponding stop surfaces 34 and 35 carried by the ends of the temple 13 and the front piece 11, respectively, are in abutting engagement as is conventional in the art.

If the temple 13 should now be pivoted further from the "normal open" position toward an "overextended open" position, the restraining force of the leaf spring 21 will be overcome and the temple end surface 34 will be tilted upon the corresponding stop surface 35, whereby owing to the weld connection 20 between the hinge arm extremity 19 and the leaf spring 21, the hinge arm lifts the free end of the leaf spring from the insert 25. Of course, the extent of distortion of the leaf spring is limited by the engagement of leaf spring stop portion 37 with the cover stop portion 32.

While in accordance with the Patent Statutes the preferred form and embodiment has been illustrated and described, it will be apparent that various changes and modifications may be made in the disclosed apparatus without deviating from the inventive concepts.

What is claimed is:
1. A spectacles frame assembly, comprising
   a. a frontpiece 11 containing at least one lens-receiving opening, said frontpiece having at each end a rearwardly directed counterstop face 35;
   b. a temple member 13 having at its forward end a forwardly directed front stop face 34; and
   c. means connecting said temple member with said frontpiece for pivotal movement between closed and normal open positions relative to said frontpiece, respectively, said temple member in said normal open position being arranged with its front stop face in contiguous abutting engagement with said counterstop face, said connecting means comprising
   1. hinge means including first 15 and second (16) pivotally connected hinge arms, said first arm being connected at its free end with said frontpiece; and
   2. a leaf spring 21 connected at one end with said temple member adjacent said frontpiece, said leaf spring, when in a normally non-flexed condition, extending longitudinally adjacent the inner side surface of said temple member and being connected at its other end with the free end of said second hinge arm, said leaf spring being distortable, upon pivotal displacement of said temple member beyond said normal open position toward an overextended open position, to a flexed condition to permit movement of said second hinge arm relative to said temple.

2. A spectacles frame assembly as defined in claim 1, and further including a concave cover member 27 adapted for rigid connection with said temple member to enclose said leaf spring, said cover member including a top wall portion 28 containing a slot 31 freely receiving said second hinge arm, and stop means 32 carried by said cover member for engagement by said leaf spring to limit the extent of flexure of said spring means and the extent of angular overextended displacement of said temple member beyond said normal open position.

3. A spectacles frame assembly as defined in claim 2, wherein said second hinge arm 16 contains adjacent the pivot axis of said hinge means a recess 36 that receives an edge portion of said cover top wall adjacent said slot.

4. A spectacles frame assembly as defined in claim 1, wherein said temple member includes a longitudinally extending insert portion 25, and outer 23 and inner 24 temple portions arranged on opposite sides of said insert portion, respectively, said inner temple portion containing a recess 22 for receiving said leaf spring, said leaf spring being parallel and contiguous with said planar insert portion when said temple member is in said normal open position and said leaf spring is in the nonflexed condition.

5. A spectacles frame assembly as defined in claim 4, wherein said inner and outer temple portions are formed from a non-metallic material and said insert portion comprises a metal plate, said second hinge arm being connected at its free end with said insert portion of said temple member.

* * * * *